United States Patent [19]
Guo et al.

[11] Patent Number: 5,552,486
[45] Date of Patent: Sep. 3, 1996

[54] POLYMERS FROM PROPOXYLATED ALLYL ALCOHOL

[75] Inventors: Shao-Hua Guo; Robert G. Gastinger, both of West Chester, Pa.

[73] Assignee: ARCO Chemical Technology, L.P., Greenville, Del.

[21] Appl. No.: 450,747

[22] Filed: May 25, 1995

Related U.S. Application Data

[62] Division of Ser. No. 234,745, Apr. 28, 1994, Pat. No. 5,451,652.

[51] Int. Cl.$^6$ .......................... C08G 18/62; C08G 63/52; C08L 29/10; C08L 29/02

[52] U.S. Cl. .......................... 525/118; 525/42; 525/74; 525/123; 525/127; 525/134; 525/162; 525/207; 525/301; 525/301.5; 525/312; 525/327.7; 525/328.8; 525/328.9; 525/502; 525/518; 525/529; 528/75; 528/77; 528/295.5; 528/301; 528/392; 528/393

[58] Field of Search .......................... 528/75, 77, 295.5, 528/301, 392, 393; 525/42, 74, 118, 123, 127, 134, 162, 207, 301, 301.5, 312, 328.8, 328.9, 327.7, 502, 518, 529

[56] References Cited

U.S. PATENT DOCUMENTS

| | | | |
|---|---|---|---|
| 2,555,775 | 6/1951 | Adelson . | |
| 2,894,938 | 7/1959 | Chapin et al. | 260/88.1 |
| 2,917,538 | 12/1959 | Carlyle | 260/486 |
| 2,940,946 | 6/1960 | Shokal et al. | 260/23 |
| 2,965,615 | 12/1960 | Tess | 260/77.5 |
| 3,267,058 | 8/1966 | Hixenbaugh | 260/23 |
| 3,268,561 | 8/1966 | Peppel et al. | 260/348 |
| 3,423,341 | 1/1969 | Klare et al. | 260/22 |
| 3,457,324 | 7/1969 | Sekmakas | 260/834 |
| 3,483,152 | 12/1969 | Koch | 260/23.7 |
| 3,641,198 | 2/1972 | Grosjean . | |
| 4,070,530 | 1/1978 | Hobbs | 526/7 |
| 4,618,703 | 10/1986 | Thanawalla et al. | 560/209 |
| 4,722,978 | 2/1988 | Yu | 525/404 |

FOREIGN PATENT DOCUMENTS

| | | | |
|---|---|---|---|
| 45-28786 | 9/1970 | Japan . | |
| 185514 | 8/1986 | Japan | 526/333 |
| 1240227 | 7/1971 | United Kingdom . | |

OTHER PUBLICATIONS

"Solubility Parameters . . . " H. Ahmad; *Journal of Oil and Colour Chemists Assoc.* 63(7) pp. 263–270; Jul. 1980.

Swern et al., *J. Am. Chem. Soc.*, 71 (1949) 1152.

*Primary Examiner*—David Buttner
*Attorney, Agent, or Firm*—Jonathan L. Schuchardt

[57] ABSTRACT

Propoxylated allyl alcohol homopolymers and copolymers of allyl alcohol and propoxylated allyl alcohol are disclosed. The polymers are soluble in many organic solvents, making them useful in a variety of applications, including polyesters, polyurethanes, alkyds, uralkyds, polyamines, acrylates, crosslinked polymeric resins, and polymer blends.

6 Claims, No Drawings

POLYMERS FROM PROPOXYLATED ALLYL ALCOHOL

This is a division of application Ser. No. 08/234,745 filed Apr. 28, 1994, now U.S. Pat. No. 5,451,652.

FIELD OF THE INVENTION

The invention relates to polymers derived from propoxylated allyl alcohol. In particular, the invention involves propoxylated allyl alcohol homopolymers, and copolymers derived from allyl alcohol and propoxylated allyl alcohol. The polymers and copolymers of the invention are useful in a variety of applications, including polyesters, polyurethanes, alkyds, uralkyds, polyamines, acrylates, crosslinked thermoset polymers, and polymer blends.

BACKGROUND OF THE INVENTION

Allyl alcohol, which is available commercially from isomerization of propylene oxide, is widely used to make allyl ether, ester, and carbonate derivatives such as, for example, diallyl phthalate and diethylene glycol bis(allyl carbonate).

Poly(allyl alcohol) is known, but it is difficult to prepare, and its usefulness is limited by its poor solubility in most common organic solvents. For example, poly(allyl alcohol) is soluble in alcohols, but is generally insoluble in ethers, esters, ketones, glycol ethers, and hydrocarbons. Solubility in water is also poor, except for hot water. Consequently, poly(allyl alcohol) has limited utility as a chemical intermediate.

Copolymerization of allyl alcohol with vinyl monomers is a potential way to make polymers having a high content of primary hydroxyl groups. Allyl alcohol copolymerizes with some vinyl monomers. However, because allyl alcohol is typically much less reactive than most common vinyl monomers (such as styrene), it is difficult to prepare allyl alcohol copolymers that incorporate a useful proportion of allyl alcohol recurring units. See, for example, U.S. Pat. Nos. 2,894,938 and 2,940,946. Thus, few allyl alcohol copolymers are widely used commercially in spite of the recognized value of polymers having a high content of primary hydroxyl groups.

Propoxylated allyl alcohol can be made by reacting allyl alcohol with propylene oxide in the presence of a basic catalyst, as described for example, in U.S. Pat. Nos. 3,268,561 and 4,618,703, and in *J. Am. Chem. Soc.* 71 (1949) 1152. Adjusting the ratio of allyl alcohol and propylene oxide to keep the average number of oxypropylene units in the propoxylated allyl alcohol at less than about 2 gives propoxylated allyl alcohol that is readily purified by distillation. In copending application Ser. No. 08/098,114, we described copolymers of these propoxylated allyl alcohols and vinyl aromatic monomers, and the use of the copolymers for polyurethanes, coatings, and unsaturated polyesters.

Still needed in the art are new hydroxyl-containing polymers. In particular, formulators need polymers that have a high concentration of hydroxyl groups, yet still maintain good solubility in water and/or a wide range of common organic solvents. Preferably, the polymers could be easily prepared, and would overcome the solubility limitations of available hydroxyl-containing polymers such as poly(allyl alcohol). The ability to adjust the solubility characteristics of the polymers to suit a particular end use would be valuable, and would greatly expand the potential use of these polymers in many polymer applications, such as polyurethanes, polyesters, alkyds, uralkyds, polyamines, and acrylates.

SUMMARY OF THE INVENTION

The invention is a propoxylated allyl alcohol polymer. In one aspect, the invention is a polymer that consists essentially of recurring units of a propoxylated allyl alcohol. The propoxylated allyl alcohol monomer has the formula:

$$CH_2=CH-CH_2-(A)_n-OH$$

in which A is an oxypropylene group, and n, which is the average number of oxypropylene groups in the propoxylated allyl alcohol, has a value less than or equal to 5. The polymer has an average hydroxyl functionality within the range of about 2 to about 10, and a number average molecular weight within the range of about 300 to about 15,000.

The invention includes copolymers which comprise recurring units of allyl alcohol and propoxylated allyl alcohol. These copolymers also have an average hydroxyl functionality within the range of about 2 to about 10, and a number average molecular weight within the range of about 300 to about 15,000.

The polymers and copolymers of the invention are easier to prepare than poly(allyl alcohol). In addition, the compositions of the invention have favorable solubility profiles. Because they are soluble in a relatively broad range of common organic solvents, the polymers and copolymers of the invention can be formulated into a wide variety of end uses, including polyesters, polyurethanes, crosslinked thermoset polymers, alkyds, uralkyds, polyamines, and acrylates. The solubilities of the polymers are easily adjusted by controlling the proportion of propoxylated allyl alcohol recurring units in the polymers.

DETAILED DESCRIPTION OF THE INVENTION

The invention relates to polymers derived from propoxylated allyl alcohol. Suitable propoxylated allyl alcohols have the formula:

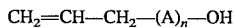

$$CH_2=CH-CH_2-(A)_n-OH$$

in which A is an oxypropylene group, and n, which is the average number of oxypropylene groups in the propoxylated allyl alcohol, has a value less than or equal to 5. The oxypropylene groups in the propoxylated allyl alcohols have one or both of the structures $-OCH(CH_3)-CH_2-$ and $-OCH_2-CH(CH_3)-$, which will depend on the method of synthesis. Suitable propoxylated allyl alcohols can be prepared by reacting allyl alcohol with up to 5 equivalents of propylene oxide in the presence of a basic catalyst as described, for example, in U.S. Pat. Nos. 3,268,561 and 4,618,703, the teachings of which are incorporated herein by reference herein in their entirety. As will be apparent to those skilled in the art, suitable propoxylated allyl alcohols can also be made by acid catalysis, as described, for example in *J. Am. Chem. Soc.* 71 (1949) 1152. Preferred propoxylated allyl alcohols are those for which n has a value within the range of about 1 to about 2.

The invention includes polymers that consist essentially of recurring units of the propoxylated allyl alcohol monomers described above. These propoxylated allyl alcohol polymers will have average hydroxyl functionalities within the range of about 2 to about 10. A preferred range is from about 3 to about 6; most preferred is the range from about 4 to about 6.

The propoxylated allyl alcohol polymers of the invention will have number average molecular weights within the range of about 300 to about 5000. A more preferred range is from about 500 to about 5000; most preferred is the range from about 1000 to about 5000.

We have found that propoxylated allyl alcohol polymers with the average hydroxyl functionalities and number average molecular weights described above are easily manufactured, and are well-suited for use as chemical intermediates in broad range of end uses because of their high content of hydroxyl groups and favorable solubility profiles.

The invention also includes copolymers which comprise recurring units of allyl alcohol and propoxylated allyl alcohol monomers. Suitable propoxylated allyl alcohols have already been described. Any desired grade of allyl alcohol can be used; technical and commercially available grades will suffice for most purposes.

The copolymers of allyl alcohol and propoxylated allyl alcohol will have average hydroxyl functionalities within the range of about 2 to about 10. A preferred range is from about 3 to about 6; most preferred is the range from about 4 to about 6. The copolymers will have number average molecular weights within the range of about 300 to about 5000. A more preferred range is from about 500 to about 5000; most preferred is the range from about 1000 to about 5000.

The proportions of allyl alcohol and propoxylated allyl alcohol recurring units in the copolymers of the invention can vary broadly. The ability to make a wide spectrum of different products is a valuable tool for controlling the solubility of the copolymers in water and various organic solvents. Generally, the copolymers will have from about 1 to about 99 wt. % of allyl alcohol recurring units, and from about 99 to about 1 wt. % of propoxylated allyl alcohol recurring units. More preferred copolymers will have from about 10 to about 85 wt. % of allyl alcohol recurring units, and from about 90 to about 15 wt. % of propoxylated allyl alcohol recurring units. Most preferred copolymers will have from about 25 to about 75 wt. % allyl alcohol recurring units, and from about 75 to about 25 wt. % of propoxylated allyl alcohol recurring units.

The propoxylated allyl alcohol polymers and copolymers of the invention are made by free-radical polymerization. The monomers can be simply combined and heated in the presence of a free-radical initiator at a temperature effective to polymerize the monomers. Suitable free-radical initiators are the peroxide and azo-type initiators well known to those skilled in the art. Peroxide initiators are preferred. Examples include hydrogen peroxide, benzoyl peroxide, di-tert-butylperoxide, tert-butylhydroperoxide, tert-butylperbenzoate, azobis(isobutyronitrile) (AIBN), and the like.

Although the monomers can be simply combined and polymerized, we found that improved yields can be achieved if the initiator is added gradually to the polymerization mixture during the course of the polymerization. Thus, it is preferred to introduce the initiator either continuously or intermittently to the polymerization reaction mixture.

The process can be performed at any temperature effective to initiate free-radical polymerization. Generally, it is preferred to perform the reaction at a temperature within the range of about 90° C. to about 200° C. A more preferred range is from about 125° C. to about 180° C.; most preferred is the range from about 135° C. to about 165° C.

The polymerizations can be performed at any suitable pressure. Generally, it is preferred to perform the polymerization at pressures greater than 1 atmosphere, particularly when allyl alcohol is a reactant. Particularly preferred is the pressure range from about 20 to about 500 psi.

Optionally, a solvent is included in the polymerization. Suitable solvents are those in which the monomers, free-radical initiator, and polymeric reaction products are soluble. Preferred solvents for the polymerization include alcohols, ethers, esters, glycols, glycol ethers, and glycol ether esters. Hydrocarbons are generally not suitable because the polymer products are usually not soluble in hydrocarbons.

Compared with poly(allyl alcohol), the propoxylated allyl alcohol polymers and the allyl alcohol/propoxylated allyl alcohol copolymers of the invention are soluble in a broader range of organic solvents. Poly(allyl alcohol) is generally soluble in alcohols, but is not soluble in many commonly used organic solvents such as ethers, esters, ketones, and hydrocarbons (see Table 2, Polymer B). In contrast, the polymers and copolymers of the invention, which are derived at least partially from propoxylated allyl alcohol, are soluble in a broad range of solvents (Table 2, Polymers C through H). Propoxylated allyl alcohol homopolymers are even soluble in esters and hydrocarbons (Table 2, Polymer A). The improved solubility characteristics of the polymers and copolymers of the invention in organic solvents give formulators of adhesives, coatings, elastomers, and sealants greater flexibility. Interestingly, some types of propoxylated allyl alcohol copolymers also appear to have improved water solubility (see Polymer E), which suggests their use in water-based applications.

Propoxylated allyl alcohol polymers and copolymers are useful in a variety of applications, including, for example, polyesters, polyurethanes, alkyds, uralkyds, polyamines, acrylates, crosslinked thermoset polymers, and polymer blends. Some of these uses are described in detail in the description below and in the examples.

The invention includes thermoset polyester compositions prepared by reacting a propoxylated allyl alcohol polymer or copolymer with an anhydride or a di- or polycarboxylic acid. The use of such a reaction to make a non-solvent thermoset polyester adhesive is shown in Example 9 below, while Example 14 illustrates a thermosetting polyester coating composition. Suitable anhydrides and carboxylic acids are those commonly used in the polyester industry. Examples include, but are not limited to, phthalic anhydride, phthalic acid, maleic anhydride, maleic acid, adipic acid, isophthalic acid, terephthalic acid, sebacic acid, succinic acid, trimellitic anhydride, and the like, and mixtures thereof. Other suitable methods for making thermoset polyester compositions are described in U.S. Pat. No. 3,457,324, the teachings of which are incorporated herein by reference.

A polyurethane composition is made by reacting a propoxylated allyl alcohol polymer or copolymer of the invention with a di- or polyisocyanate or an isocyanate-terminated prepolymer. Prepolymers derived from the propoxylated allyl alcohol polymers of the invention and a di- or polyisocyanate can be used. Optionally, a low-molecular weight chain extender (diol, diamine, or the like) is included. Suitable di- or polyisocyanates am those well known in the polyurethane industry, and include, for example, toluene diisocyanate, MDI, polymeric MDIs, carbodiimide-modified MDIs, hydrogenated MDIs, isophorone diisocyanate, and the like. Isocyanate-terminated prepolymers are made in the usual way from a di- or polyisocyanate and a polyether polyol, polyester polyol, or the like. The polyurethane is formulated at any desired NCO index. If desired, all of the available NCO groups are reacted with hydroxyl groups from the propoxylated allyl alcohol polymer and any chain extenders. Alternatively, an excess of NCO groups remain in the product, as in a moisture-cured polyurethane. Many types of polyurethanes products can be made, including, for example, adhesives, coatings, sealants, and elastomers. Example 10 illustrates a non-solvent polyurethane adhesive prepared from an isocyanate-terminated prepolymer and an allyl alcohol/propoxylated allyl alcohol copolymer. Other suitable methods for making polyurethane compositions are described in U.S. Pat. No. 2,965,615, the teachings of which are incorporated herein by reference.

The invention also includes alkyd compositions prepared by reacting the propoxylated allyl alcohol polymers and copolymers of the invention with an unsaturated fatty acid. Suitable unsaturated fatty acids are those known in the art as useful for alkyd resins, and include, for example, oleic acid, ricinoleic acid, linoleic acid, licanic acid, and the like, and mixtures thereof. Mixtures of unsaturated fatty acids and saturated fatty acids such as lauric acid or palmitic acid can also be used. The alkyd resins are particularly useful for making alkyd coatings. For example, a propoxylated allyl alcohol polymer, or a mixture of the propoxylated allyl alcohol polymer and glycerin or another low molecular weight polyol, is first partially esterified with an unsaturated fatty acid to give an alkyd resin. The resin is then combined with an organic solvent, and the resin solution is stored until needed. A drying agent such as lead acetate or cobalt acetate is added to the solution of alkyd resin, the solution is spread onto a surface, the solvent evaporates, and the resin cures leaving an alkyd coating of the invention. Example 15 below shows one way to make an alkyd coating of the invention. Other suitable methods for making alkyd resins and coatings are described in U.S. Pat. No. 3,423,341, the teachings of which are incorporated herein by reference.

Instead of combining the alkyd resin with an organic solvent, the resin can be dispersed in water to make a water-based alkyd coating formulation. To improve the water dispersability of the alkyd resin, a free hydroxyl group in the alkyd resin can be converted to a salt. For example, the alkyd resin can be reacted with phthalic anhydride to give a resin that contains phthalic acid residues; addition of sodium hydroxide makes the sodium phthalate salt, and provides a water-dispersable alkyd resin derived from the propoxylated allyl alcohol polymer or copolymer. See, for example, U.S. Pat. No. 3,483,152.

The invention includes polyurethane-modified alkyd compositions (uralkyds) prepared from the propoxylated allyl alcohol polymers and copolymers. These resins am especially valuable for making uralkyd coatings. The propoxylated allyl alcohol polymer or copolymer is first partially esterified with an unsaturated fatty acid (described above) to give an alkyd resin. The alkyd resin, which contains some free hydroxyl groups, is reacted with a di- or polyisocyanate (described above) to give a prepolymer. The prepolymer is then reacted with a chain extender, atmospheric moisture, or additional alkyd resin to give a uralkyd coating. Other suitable methods for making uralkyd resins and coatings are described in U.S. Pat. No. 3,267,058, the teachings of which are incorporated herein by reference.

The invention includes crosslinked thermoset polymers prepared by reacting the propoxylated allyl alcohol polymers and copolymers of the invention with a thermoplastic polymer or a crosslinking agent. For example, melamine-based polymers, especially coatings, can be prepared by reacting the propoxylated allyl alcohol polymers and copolymers of the invention with melamine resins. Suitable melamine resins include commercial grade hexamethoxymethylmelamines, such as, for example CYMEL 303 crosslinking agent, a product of American Cyanamid Company. A thermoset resin composition is obtained by reacting the propoxylated allyl alcohol polymer with a crosslinkable thermoplastic resin. Suitable crosslinkable thermoplastic resins are anhydride or carboxylic acid-containing polymers such as, for example, polyacrylic acid, polymethacrylic acid, isobutylene-maleic anhydride copolymers, and styrene-maleic anhydride copolymers. Example 11 below illustrates this kind of process.

Polyamine compositions of the invention are the reaction products of the propoxylated allyl alcohol polymers or copolymers with ammonia or a primary or secondary amine. Some or all of the hydroxyl groups of the propoxylated allyl alcohol polymer are converted to primary, secondary, or tertiary amino groups by catalytic amination or any other suitable technique. A typical amination procedure is described in Example 12 below. A suitable amination method is also described, for example, in U.S. Pat. No. 4,070,530, the teachings of which are incorporated herein by reference.

An acrylate composition of the invention is prepared by reacting some or all of the hydroxyl groups of the propoxylated allyl alcohol polymers or copolymers with an acrylic acid or an acrylic acid derivative. Suitable acrylic acids and derivatives include acrylic acid, methacrylic acid, acryloyl chloride, methacryloyl chloride, methyl acrylate, methyl methacrylate, and the like. Example 13 below illustrates this application. Suitable methods for preparing acrylates are described, for example, in U.S. Pat. No. 2,917,538, the teachings of which are incorporated herein by reference.

The favorable solubility characteristics of the propoxylated allyl alcohol polymers and copolymers of the invention make them well-suited for blending with other polymers. The polymers of the invention are easily blended with, for example, polyether polyols, phenolic resins, and epoxy resins, and the blends can be used in the applications described earlier. The propoxylated allyl alcohol polymers and copolymers of the invention can also be used as compatibilizers to improve the miscibility of polymer mixtures, In contrast, poly(allyl alcohol) is generally not compatible with other polymers, and cannot be blended with polymers or used as a compatibilizer for other polymers.

The following examples merely illustrate the invention. Those skilled in the art will recognize many variations that are within the spirit of the invention and scope of the claims.

Example 1. Preparation of Propoxylated Allyl Alcohol Homopolymer (Polymer A)

A one-liter stainless-steel reactor equipped with a mechanical stirrer, steam heating jacket, temperature controller, and inlets for nitrogen and vacuum, is charged with propoxylated allyl alcohol (average of 1.6 oxypropylene units, 500 g) and di-tert-butylperoxide (15 g). The reactor is purged three times with nitrogen and sealed, and the contents are heated to 165° C. Additional di-tert-butylperoxide (40 g) is continuously added to the reactor over 2 h. Heating continues at 165° C. for 0.5 h after completing the peroxide addition. The mixture is vacuum stripped to remove most of the unreacted monomer, and is then stripped in the presence of water (2%) to remove traces of unreacted monomer at a maximum temperature of 185° C. The product (371 g), a homopolymer of propoxylated allyl alcohol, has Mn=1160, Mw=2450, and is soluble in a wide range of organic solvents (see Table 2).

Comparative Example 2. Preparation of Poly(Allyl Alcohol) (Polymer B)

The procedure of Example 1 is generally followed. The reactor is initially charged with allyl alcohol (432 g). After heating to 150° C., di-tert-butylperoxide (61 g) is continuously added to the reactor over 4 h. Heating continues at 150° C. for 0.5 h after completing the peroxide addition. The product is stripped as described above at a maximum of 160° C. to remove unreacted monomers. The product (121 g), poly(allyl alcohol), has relatively limited solubility in organic solvents (see Table 2).

Example 3: Preparation of Allyl Alcohol/Propoxylated Allyl Alcohol Copolymer: Gradual Addition of the Initiator (Polymer C)

The procedure of Example 1 is generally followed. The reactor is charged with propoxylated allyl alcohol (average of 1.0 oxypropylene units, 134 g) and allyl alcohol (134 g). The reactor is heated to 150° C., and di-tert-butylperoxide (55 g) is added to the reactor continuously over 2.5 h. The product is stripped as described above at a maximum of 165° C. to remove unreacted monomers. A copolymer of allyl alcohol and propoxylated allyl alcohol(149 g) is isolated and characterized (see Tables 1 and 2). The yield obtained is 56% based on the weight of charged monomers.

Comparative Example 4: Preparation of Allyl Alcohol/Propoxylated Allyl Alcohol Copolymer: All of the Initiator Charged at the Start of the Polymerization (Polymer D)

The procedure of Example 3 is generally followed, except that all of the required di-tert-butylperoxide is added at the start of the polymerization. The reactor is charged with propoxylated allyl alcohol (average of 1.0 oxypropylene units, 200 g) and allyl alcohol (200 g). The reactor is heated to 155° C. for 6.5 h. The product is stripped as described above at a maximum of 165° C. to remove unreacted monomers. A copolymer of allyl alcohol and propoxylated allyl alcohol (69 g) is isolated and characterized (see Tables 1 and 2). The yield obtained is 17% based on the weight of charged monomers.

The results of Example 3 and Comparative Example 4 demonstrate that higher yields of copolymers result when the free-radical initiator is gradually added during the course of the polymerization.

Examples 5–8. Preparation of Allyl Alcohol/Propoxylated Allyl Alcohol Copolymers Example 5. (Polymer E)

The procedure of Example 3 is generally followed. The reactor is charged with propoxylated allyl alcohol (average of 1.0 oxypropylene units, 276 g) and allyl alcohol (92 g). The reactor is heated to 150° C., and di-tert-butylperoxide (55 g) is added to the reactor continuously over 4 h. The product is stripped as described above at a maximum of 165° C. to remove unreacted monomers. A copolymer of allyl alcohol and propoxylated allyl alcohol(153 g) is isolated and characterized (see Tables 1 and 2).

Example 6. (Polymer F)

The procedure of Example 3 is generally followed. The reactor is charged with propoxylated allyl alcohol (average of 1.0 oxypropylene units, 75 g) allyl alcohol (225 g), and di-tert-butylperoxide (10 g). The reactor is heated to 150° C., and the remaining di-tert-butylperoxide (40 g) is added to the reactor continuously over 2.5 h. The product is stripped as described above at a maximum of 165° C. to remove unreacted monomers. A copolymer of allyl alcohol and propoxylated allyl alcohol (160 g) is isolated and characterized (see Tables 1 and 2).

Example 7. (Polymer G)

The procedure of Example 3 is generally followed. The reactor is charged with propoxylated allyl alcohol (average of 1.6 oxypropylene units, 167 g) allyl alcohol (500 g), and di-tert-butylperoxide (20 g). The reactor is heated to 165° C., and the remaining di-tert-butylperoxide (80 g) is added to the reactor continuously over 4 h. The product is stripped as described above at a maximum of 200° C. to remove unreacted monomers. A copolymer of allyl alcohol and propoxylated allyl alcohol (173 g) is isolated and characterized (see Tables 1 and 2).

Example 8. (Polymer H)

The procedure of Example 3 is generally followed. The reactor is charged with propoxylated allyl alcohol (average of 1.6 oxypropylene units, 300 g) allyl alcohol (300 g), and di-tert-butylperoxide (20 g). The reactor is heated to 165° C., and the remaining di-tert-butylperoxide (70 g) is added to the reactor continuously over 3.5 h. The product is stripped as described above at a maximum of 200° C. to remove unreacted monomers. A copolymer of allyl alcohol and propoxylated allyl alcohol (319 g) is isolated and characterized (see Tables 1 and 2).

Example 9. Preparation of a Thermoset Polyester Composition

This example illustrates the preparation of a non-solvent adhesive by reacting an allyl alcohol/propoxylated allyl alcohol copolymer with phthalic anhydride. Copolymer F, prepared as in Example 6 (10 g), is heated to 80° C. to give a free-flowing liquid, and is mixed with phthalic anhydride (1.0 g). After the phthalic anhydride dissolves completely, the resulting adhesive mixture is used to bond two pieces of wood, stainless steel, or glass coupons. The bonded samples are cured at 180° C. for 6 h. In each case, good adhesion results.

Example 10. Preparation of a Polyurethane Composition

This example illustrates the preparation of a non-solvent polyurethane adhesive by reacting an allyl alcohol/propoxylated allyl alcohol copolymer with an isocyanate-terminated prepolymer.

Copolymer D, prepared as in Comparative Example 4 (10 g), is mixed well at room temperature with 10 g of a prepolymer (5.7 wt. % free NCO) prepared from ARCOL 3020 polyether triol (2000 mol. wt., all-PO triol, product of ARCO Chemical Co.), and toluene diisocyanate. The resulting adhesive mixture is used to bond pieces of wood, stainless steel, glass, and polystyrene plastic. The bonded samples are cured at room temperature for 4 h. In each case, good adhesion results.

Example 11. Preparation of a Thermoset Resin Composition

In this example, an allyl alcohol/propoxylated allyl alcohol copolymer is reacted with a crosslinkable thermoplastic resin to produce a thermoset resin composition.

DYLARK 378 resin (a terpolymer of styrene (67%), maleic anhydride (13%), and butadiene rubber (20%), product of ARCO Chemical Co., 10 g) and Copolymer C (2 g, prepared as in Example 3) are dissolved in tetrahydrofuran (50 g). The solution is spread and dried on an aluminum pan. The resulting polymer film is cured at 200° C. for 0.5 h. The cured film is not soluble in tetrahydrofuran.

Example 13. Preparation of an Acrylate Composition

In this example, an allyl alcohol/propoxylated allyl alcohol copolymer is reacted with acrylic acid to make an acrylate composition. Copolymer C (100 g, prepared as in Example 3), acrylic acid (86.5 g), toluene (20 g), hydro-

TABLE 1

Propoxylated Allyl Alcohol Polymers: Identification and Characterization

| Ex. # | Polymer (see Table 1) | Type | Charged AA/AAP | Ave. # PO units in AAP | AA/AAP found in product[1] | Mn (GPC) | Mw (GPC) | % Yield of polymer |
|---|---|---|---|---|---|---|---|---|
| 1 | A | AAP homopolymer | — | 1.6 | — | 1160 | 2450 | 74 |
| C2 | B | Poly(allyl alcohol) | — | — | — | * | * | 28 |
| 3 | C | AA/AAP copolymers | 50/50 | 1.0 | 56/44 | 1000 | 3030 | 56 |
| C4** | D |  | 50/50 | 1.0 | 46/54 | 610 | 980 | 17 |
| 5 | E |  | 25/75 | 1.0 | 51/49 | 720 | 1140 | 42 |
| 6 | F |  | 75/25 | 1.0 | 89/11 | 580 | 1160 | 53 |
| 7 | G |  | 75/25 | 1.6 | 91/9 | 560 | 940 | 26 |
| 8 | H |  | 50/50 | 1.6 | 83/17 | 910 | 2360 | 53 |

*Polymer not soluble: molecular weight not measured.
**All of the intitiator added at the start of the polymerization.
[1]As measured by $^{13}C$ NMR spectroscopy.
AAP homopolymer = propoxylated allyl alcohol homopolymer; AA/AAP copolymer = copolymer of propoxylated allyl alcohol and allyl alcohol.

TABLE 2

Solubility Data for Propoxylated Allyl Alcohol Polymers

| | Polymer A | Polymer B* | Polymer C | Polymer D | Polymer E | Polymer F | Polymer G | Polymer H |
|---|---|---|---|---|---|---|---|---|
| MeOH, EtOH, IPA, PG, EB | sol | sol | sol | sol | sol | sol | sol | sol |
| PTB | sol | insol | sol | p. sol | sol | p. sol | p. sol | sol |
| THF | sol | insol | sol | p. sol | sol | insol | p. sol | sol |
| acetone | sol | insol | p. sol | p. sol | sol | insol | p. sol | p. sol |
| MEK | sol | insol | p. sol | insol | sol | sol | insol | p. sol |
| MIBK | sol | insol | insol | insol | insol | insol | insol | insol |
| EtOAc | sol | insol | insol | insol | insol | insol | insol | insol |
| xylenes | sol | insol | insol | insol | insol | insol | insol | insol |
| water | p. sol | p. sol | p. sol | p. sol | sol | p. sol | p. sol | p. sol |

MeOH = methanol, EtOH = ethanol, IPA = isopropyl alcohol; PG = propylene glycol; EB = ethylene glycol n-butyl ether; PTB = propylene glycol tert-butyl ether; THF = tetrahydrofuran; MEK = methyl ethyl ketone; MIBK = methyl isobutyl ketone, EtOAc = ethyl acetate. Solubility is tested by mixing 10 wt. % polymer in the solvent to give a clear solution (soluble = sol), a cloudy solution (partly soluble = p. sol), or two distinct layers (insoluble = insol).
*Comparative example: poly(allyl alcohol)

Example 12. Preparation of a Polyamine Composition

In this example, an allyl alcohol/propoxylated allyl alcohol copolymer is reacted with ammonia to produce a polyamine. Copolymer C (60 g, prepared as in Example 3), ammonia (45 g), and Raney nickel (10 g) are charged into an one-liter stainless steel reactor. The reactor is pressured with 100 psig of hydrogen, and the contents are heated to 250° C. for 6.5 hours with agitation. During this time, the pressure increases to about 2500 psig. After cooling, the reactor is vented, and the product is filtered to remove the nickel catalyst. The expected product is a copolymer of allyl alcohol and propoxylated allyl alcohol in which most of the hydroxyl groups from the copolymer are converted to primary amino groups.

quinone (0.15 g), and sulfuric acid (0.15 g), are charged into a reactor equipped with an agitator, thermometer, reflux condenser with Dean-Stark trap, and nitrogen inlet. The mixture is heated to reflux (about 100° C. to 115° C.), and water (21.6 g) is removed using the trap. After no additional water is being produced, the toluene is removed by vaccum distillation. The expected product is a copolymer of allyl alcohol and propoxylated allyl alcohol in which most of the hydroxyl groups from the copolymer are converted to acrylate ester groups.

Example 14. Preparation of a Thermoset Polyester Composition

In this example, an allyl alcohol/propoxylated allyl alcohol copolymer is formulated into a thermosetting polyester coating composition. Copolymer C (500 g, as prepared in Example 3) and isophthalic acid (94 g) are charged into a reactor and heated to 220° C. while sparging nitrogen through the mixture. After the acid number reaches 60–70 mg KOH/g, adipic acid (73 g), isophthalic acid (60 g), and maleic anhydride (6 g) are added, and the mixture is reheated to 220° C. Heating continues at 220° C. until the acid number drops to 10–12 mg KOH/g. 2-Ethoxyethanol acetate (270 g) is then added.

Six hundred grams of the resulting polyester solution is charged into a reactor equipped with an agitator, thermometer, reflux condenser, addition funnel, and nitrogen inlet, and the mixture is heated to 120° C. A mixture of 2-hydroxyethyl acrylate (10 g), ethyl acrylate (54 g), styrene (5 g), methyl methacrylate (20 g), methacrylic acid (2 g), and di-t-butyl peroxide (1.0 g) is charged to the addition funnel. The acrylate monomer mixture is added to the polyester mixture over 2 h, and is then kept at 120° C. for another hour. t-Butyl perbenzoate (0.2 g) is added, and the mixture is kept at 120° C. for another 2 h. A second 0.2 g portion of t-butyl perbenzoate is added, and heating continues for another 2 h. The product solution is finally diluted with 1-butanol (30 g) and xylene (20 g). This solution is expected to be useful as a thermosettable coating composition. The solution can be applied as a film, and allowed to cure at room temperature or elevated temperature.

Example 15. Preparation of an Alkyd Composition

An alkyd coating composition prepared from an allyl alcohol/propoxylated allyl alcohol copolymer is described below. Copolymer C (87 g, prepared as described in Example 3), safflower oil (64 g), lithium hydroxide (0.03 g), phthalic anhydride (25.5 g), maleic anhydride (0.22 g), triphenyl phosphite (0.07 g), and xylene (18 g) are charged into a reactor equipped with an agitator, thermometer, reflux condenser with a Dean-Stark trap, and nitrogen inlet. The mixture is heated to 240° C., and kept at that temperature until the acid number drops to 10–20 mg KOH/gl. After reaction, xylene is added to dilute the mixture to 50 wt. % solids. This solution is expected to be useful as an alkyd coating. The solution can be applied as a film, and allowed to cure at room temperature or at elevated temperature.

The preceding examples are meant as illustrations; the following claims define the scope of the invention.

We claim:

1. A propoxylated allyl alcohol polymer derivative which comprises the reaction product of:
    (a) a copolymer which comprises recurring units of:
        (1) allyl alcohol; and
        (2) a propoxylated allyl alcohol of the formula

in which A is an oxypropylene group, and n, which is the average number of oxypropylene groups in the propoxylated allyl alcohol, has a value within the range of about 1 to about 5;
        wherein the copolymer has an average hydroxyl functionality within the range of about 2 to about 10, and a number average molecular weight within the range of about 300 to about 5000; and
    (b) a member selected from the group consisting of:
        (1) an anhydride or a di- or polycarboxylic acid, to produce a thermoset polyester;
        (2) a polyisocyanate or an isocyanate-terminated prepolymer, to produce a polyurethane;
        (3) an anhydride- or carboxylic acid-containing polymer, to produce a thermoset resin;
        (4) a melamine resin, to produce a melamine-based polymer;
        (5) an unsaturated fatty acid, to produce an alkyd;
        (6) an unsaturated fatty acid, a low molecular weight polyol, and a polyisocyanate to produce a polyurethane-modified alkyd;
        (7) ammonia or a primary or secondary amine, to produce a polyamine;
        (8) acrylic acid or an acrylic acid derivative, to produce an acrylate.

2. A polymer blend which comprises:
    (a) a copolymer which comprises recurring units of:
        (1) allyl alcohol; and
        (2) a propoxylated allyl alcohol of the formula

in which A is an oxypropylene group, and n, which is the average number of oxypropylene groups in the propoxylated allyl alcohol, has a value within the range of about 1 to about 5;
        wherein the copolymer has an average hydroxyl functionality within the range of about 2 to about 10, and a number average molecular weight within the range of about 300 to about 5000; and
    (b) one or more polymers selected from the group consisting of polyether polyols, phenolic resins, and epoxy resins.

3. A propoxylated allyl alcohol polymer derivative which comprises the reaction product of:
    (a) the polymer blend of claim 2; and
    (b) a member selected from the group consisting of:
        (1) an anhydride or a di- or polycarboxylic acid, to produce a thermoset polyester;
        (2) a polyisocyanate or an isocyanate-terminated prepolymer, to produce a polyurethane;
        (3) an anhydride- or carboxylic acid-containing polymer, to produce a thermoset resin:
        (4) a melamine resin, to produce a melamine-based polymer;
        (5) an unsaturated fatty acid, to produce an alkyd;
        (6) an unsaturated fatty acid, a low molecular weight polyol, and a polyisocyanate to produce a polyurethane-modified alkyd;
        (7) ammonia or a primary or secondary amine, to produce a polyamine;
        (8) acrylic acid or an acrylic acid derivative, to produce an acrylate.

4. A propoxylated allyl alcohol polymer derivative which comprises the reaction product of:
    (a) a polymer which consists essentially of recurring units of a propoxylated allyl alcohol of the formula:

in which A is an oxypropylene group, and n, which is the average number of oxypropylene groups in the propoxylated allyl alcohol, has a value within the range of about 1 to about 5;
        wherein the homopolymer has an average hydroxyl functionality within the range of about 2 to about 10, and a number average molecular weight within the range of about 300 to about 5000; and
    (b) a member selected from the group consisting of:
        (1) an anhydride or a di- or polycarboxylic acid, to produce a thermoset polyester;
        (2) a polyisocyanate or an isocyanate-terminated prepolymer, to produce a polyurethane;

(3) an anhydride- or carboxylic acid-containing polymer, to produce a thermoset resin;
(4) a melamine resin, to produce a melamine-based polymer;
(5) an unsaturated fatty acid, to produce an alkyd;
(6) an unsaturated fatty acid, a low molecular weight polyol, and a polyisocyanate to produce a polyurethane-modified alkyd;
(7) ammonia or a primary or secondary amine, to produce a polyamine;
(8) acrylic acid or an acrylic acid derivative, to produce an acrylate.

5. A polymer blend which comprises:
(a) a polymer which consists essentially of recurring units of a propoxylated allyl alcohol of the formula

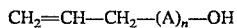

in which A is an oxypropylene group, and n, which is the average number of oxypropylene groups in the propoxylated allyl alcohol, has a value within the range of about 1 to about 5;
wherein the polymer has an average hydroxyl functionality within the range of about 2 to about 10, and a number average molecular weight within the range of about 300 to about 5000; and (b) one or more polymers selected from the group consisting of polyether polyols, phenolic resins, and epoxy resins.

6. A propoxylated allyl alcohol polymer derivative which comprises the reaction product of:
(a) the polymer blend of claim 5; and
(b) a member selected from the group consisting of:
(1) an anhydride or a di- or polycarboxylic acid, to produce a thermoset polyester;
(2) a polyisocyanate or an isocyanate-terminated prepolymer, to produce a polyurethane;
(3) an anhydride- or carboxylic acid-containing polymer, to produce a thermoset resin;
(4) a melamine resin, to produce a melamine-based polymer;
(5) an unsaturated fatty acid, to produce an alkyd;
(6) an unsaturated fatty acid, a low molecular weight polyol, and a polyisocyanate to produce a polyurethane-modified alkyd;
(7) ammonia or a primary or secondary amine, to produce a polyamine;
(8) acrylic acid or an acrylic acid derivative, to produce an acrylate.

* * * * *